(12) United States Patent
Yang

(10) Patent No.: US 9,243,691 B2
(45) Date of Patent: Jan. 26, 2016

(54) NONCIRCULAR SYNCHRONOUS TRANSMISSION PULLEY SET HAVING PERIODICALLY VARYING SPEED RATIO AND CIRCUMFERENCE COMPENSATING FUNCTION

(71) Applicant: Tai-Her Yang, Dzan-Hwa (TW)

(72) Inventor: Tai-Her Yang, Dzan-Hwa (TW)

(*) Notice: Subject to any disclaimer, the term of this patent is extended or adjusted under 35 U.S.C. 154(b) by 215 days.

(21) Appl. No.: 13/717,972

(22) Filed: Dec. 18, 2012

(65) Prior Publication Data
US 2014/0171240 A1    Jun. 19, 2014

(51) Int. Cl.
| F16H 55/30 | (2006.01) |
| --- | --- |
| F16H 55/36 | (2006.01) |
| F16H 9/00 | (2006.01) |
| F16H 59/00 | (2006.01) |
| F16H 61/00 | (2006.01) |
| F16H 63/00 | (2006.01) |
| F16H 9/04 | (2006.01) |
| B62M 9/08 | (2006.01) |
| B62M 9/00 | (2006.01) |

(52) U.S. Cl.
CPC . *F16H 9/04* (2013.01); *B62M 9/08* (2013.01); *B62M 9/085* (2013.01); *B62M 2009/002* (2013.01)

(58) Field of Classification Search
CPC ..... F16H 9/04; F16H 35/02; F16H 2035/003; F16H 7/08; B62M 9/08; B62M 9/085; B62M 2009/002
USPC .................................................. 474/71, 141
See application file for complete search history.

(56) References Cited

U.S. PATENT DOCUMENTS

| | | | | |
|---|---|---|---|---|
| 528,145 A | * | 10/1894 | Carr | 474/84 |
| 528,956 A | * | 11/1894 | Lippy et al. | 280/238 |
| 529,267 A | * | 11/1894 | Homan | 474/141 |
| 591,488 A | * | 10/1897 | McMullin | 474/81 |
| 596,289 A | * | 12/1897 | Smith | 474/141 |
| 599,211 A | * | 2/1898 | Williams | 474/141 |
| 611,170 A | * | 9/1898 | Howard | 474/134 |
| 613,756 A | * | 11/1898 | Buddle | 474/141 |
| 618,094 A | * | 1/1899 | Hess | 74/413 |
| 885,982 A | * | 4/1908 | Delacroix | 474/136 |
| 2,155,108 A | * | 4/1939 | Ware | 74/25 |
| 2,277,458 A | * | 3/1942 | Schultze | 474/134 |
| 2,876,616 A | * | 3/1959 | Austin, Jr. et al. | 57/91 |
| 2,994,216 A | * | 8/1961 | Morton | 68/140 |
| 3,259,398 A | * | 7/1966 | Hattan | 280/236 |
| 3,375,022 A | * | 3/1968 | Hattan | 280/238 |
| 3,396,988 A | * | 8/1968 | Kroening | 280/93.502 |
| 3,648,542 A | * | 3/1972 | Perotti et al. | 74/594.1 |
| 3,819,002 A | * | 6/1974 | Heathwaite et al. | 180/227 |
| 3,831,978 A | * | 8/1974 | Dunder et al. | 280/238 |
| 3,870,134 A | * | 3/1975 | Anthamatten | 192/217.5 |
| 3,873,128 A | * | 3/1975 | Dunder et al. | 280/236 |

(Continued)

*Primary Examiner* — Henry Liu
(74) *Attorney, Agent, or Firm* — Bacon & Thomas, PLLC

(57) ABSTRACT

The present invention is to install a transmission belt between two noncircular synchronous transmission pulleys, thereby providing a non-sliding synchronous transmission feature between the belt and the pulleys, when the noncircular active pulley is driven to synchronously link the noncircular passive pulley to rotate through the transmission belt, a noncircular synchronous transmission pulley set having periodically varying speed ratio and circumference compensating function is formed, through the two pulleys being formed with certain noncircular wheel shapes, during the synchronous transmission, the circumferences of the two wheel shapes can be mutually compensated.

9 Claims, 2 Drawing Sheets

(56) References Cited

U.S. PATENT DOCUMENTS

| | | | | |
|---|---|---|---|---|
| 3,899,932 A | * | 8/1975 | Durham | 474/141 |
| 3,972,244 A | * | 8/1976 | Bieser et al. | 474/17 |
| 4,103,563 A | * | 8/1978 | Genzling | 74/594.5 |
| 4,159,652 A | * | 7/1979 | Trammell, Jr. | 74/117 |
| 4,173,154 A | * | 11/1979 | Sawmiller et al. | 474/88 |
| 4,181,034 A | * | 1/1980 | Daniel | 474/141 |
| 4,193,324 A | * | 3/1980 | Marc | 475/349 |
| 4,218,931 A | * | 8/1980 | Tritenne | 474/165 |
| 4,501,576 A | * | 2/1985 | Tanaka et al. | 474/141 |
| 4,522,610 A | * | 6/1985 | Nagano | 474/141 |
| 4,816,009 A | * | 3/1989 | Philipp | 474/69 |
| 4,850,939 A | * | 7/1989 | Chilcote et al. | 474/49 |
| 4,865,577 A | * | 9/1989 | Freudenstein | 474/141 |
| 4,976,348 A | * | 12/1990 | Berry | 192/217.4 |
| 5,067,370 A | * | 11/1991 | Lemmens | 74/594.2 |
| 5,078,026 A | * | 1/1992 | Giffin | 74/594.4 |
| 5,611,556 A | * | 3/1997 | Davidow | 280/236 |
| 5,882,025 A | * | 3/1999 | Runnels | 280/259 |
| 5,899,477 A | * | 5/1999 | Vergara | 280/261 |
| 6,293,884 B1 | * | 9/2001 | Chattin | 474/160 |
| 6,371,874 B1 | * | 4/2002 | Inoue | 474/156 |
| 6,840,136 B1 | * | 1/2005 | Jones | 74/594.2 |
| 7,128,672 B2 | * | 10/2006 | Chattin | 474/141 |
| 2007/0173361 A1 | * | 7/2007 | Schuseil | 474/87 |
| 2007/0246908 A1 | * | 10/2007 | Shu | 280/261 |
| 2009/0036244 A1 | * | 2/2009 | Gravio | 474/156 |

\* cited by examiner

NONCIRCULAR SYNCHRONOUS TRANSMISSION PULLEY SET HAVING PERIODICALLY VARYING SPEED RATIO AND CIRCUMFERENCE COMPENSATING FUNCTION

BACKGROUND OF THE INVENTION (a) Field of the Invention

The present invention is to install a transmission belt between two noncircular synchronous transmission pulleys, thereby providing a non-sliding synchronous transmission feature between the belt and the pulleys, when the noncircular active pulley is driven to synchronously link the noncircular passive pulley to rotate through the transmission belt, a noncircular synchronous transmission pulley set having periodically varying speed ratio and circumference compensating function is formed, through the two pulleys being formed with certain noncircular wheel shapes, during the synchronous transmission, the circumferences of the two wheel shapes can be mutually compensated, thereby when generating periodically varying speed ratios during the synchronous transmission, the tightness of the synchronous transmission belt can be remained the same or restrained within a smaller tightness varying level, a following pre-stressed idle wheel can therefore be optionally installed.

(b) Description of the Prior Art

Both or at least one of a conventional active pulley and a passive pulley are a circular pulley and the other is a noncircular pulley for forming performing the synchronous transmission, when the active pulley is driven in the revolving period, the active pulley performs the driving with periodically varying speed ratios to the passive pulley through a synchronous transmission belt, the tightness of the synchronous transmission belt installed between the circular pulley and the noncircular synchronous transmission pulley is often varied with respect to the varying speed ratios, even if a following pre-stressed idle wheel being installed, a situation of the transmission belt being released from the transmission pulley under high rotation speed may still occur.

SUMMARY OF THE INVENTION

The present invention is to install a non-sliding synchronous transmission belt between a noncircular active pulley and a noncircular passive pulley thereby forming a transmission device; through the two noncircular pulleys being formed with certain wheel shapes, during the synchronous transmission, the circumferences of the two wheel shapes of the two noncircular pulleys can be mutually compensated, when the noncircular active pulley performs the revolving driving to the noncircular passive pulley at periodically varying speed ratios through the synchronous transmission belt, the length of synchronous transmission belt installed between the active pulley and the passive pulley can be remained the same or restrained the varying level to be smaller to the level which may cause the synchronous transmission belt being released, so a following pre-stressed idle wheel can be optionally installed; the synchronous transmission belt adopted for being operated with the mentioned noncircular active pulley and the noncircular passive pulley includes being composed of a chain wheel and a chain, a tooth-shaped wheel and a tooth-shaped belt or a tooth-shaped metal belt.

DESCRIPTION OF MAIN COMPONENT SYMBOLS

Figure 1:
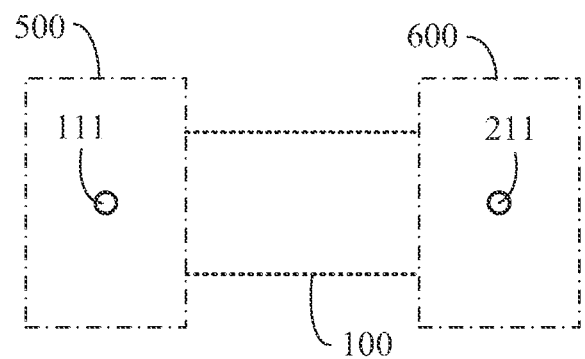
FIG. 1 is a schematic view showing the main assembly according to the present invention.

100: Transmission belt
101: First crank
102: First treadle
103: First treadle shaft
111: Active wheel shaft
201: Second crank
202: Second treadle
203: Second treadle shaft
211: Passive wheel shaft
112: Oval active pulley
213: Oval passive pulley
413: Eccentric circular passive pulley
500: Active pulley assembly
600: Passive pulley assembly

DETAILED DESCRIPTION OF THE PREFERRED EMBODIMENTS

Both or at least one of a conventional active pulley and a passive pulley are a circular pulley and the other is a noncircular pulley for forming performing the synchronous transmission, when the active pulley is driven in the revolving period, the active pulley performs the driving with periodically varying speed ratios to the passive pulley through a synchronous transmission belt, the tightness of the synchronous transmission belt installed between the circular pulley and the noncircular synchronous transmission pulley is often varied with respect to the varying speed ratios, even if a following pre-stressed idle wheel being installed, a situation of the transmission belt being released from the transmission pulley under high rotation speed may still occur;

The present invention is to install a transmission belt between two noncircular synchronous transmission pulleys, thereby providing a non-sliding synchronous transmission feature between the belt and the pulleys, when the noncircular active pulley is driven to synchronously link the noncircular passive pulley to rotate through the transmission belt, a noncircular synchronous transmission pulley set having periodically varying speed ratio and circumference compensating function is formed, through the two pulleys being formed with certain noncircular wheel shapes, during the synchronous transmission, the circumferences of the two wheel shapes can be mutually compensated, thereby when generating periodically varying speed ratios during the synchronous transmission, the tightness of the synchronous transmission belt can be remained the same or restrained within a smaller tightness varying level, a following pre-stressed idle wheel can therefore be optionally installed.

Figure 2:
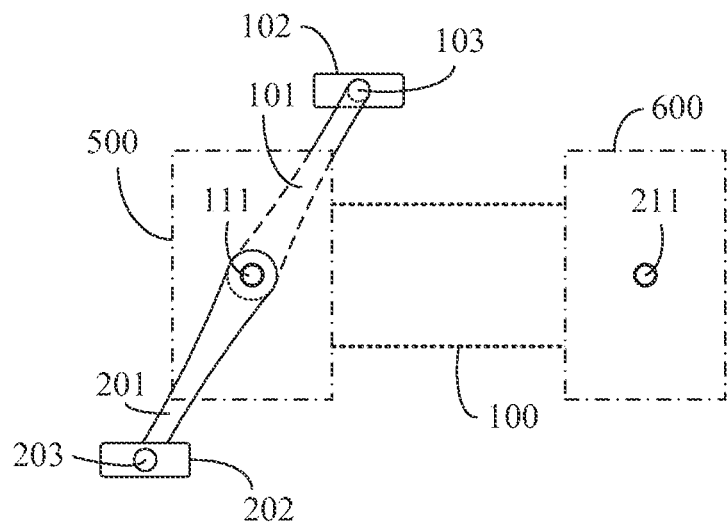
FIG. 2 is a schematic view showing the main assembly of the present invention being applied in a treadle-drive device.

According to the present invention, an active pulley is defined for representing an active chain wheel or an active tooth-shaped pulley, a passive pulley is defined for representing a passive chain wheel or a passive tooth-shaped pulley, a synchronous transmission belt is defined for representing a synchronous transmission chain or a synchronous transmission tooth-shaped belt or a synchronous transmission tooth-shaped chain; when the active pulley and the passive pulley are both formed as noncircular synchronous transmission pulleys for being driven by the synchronous transmission belt for transmission, the length varying of the transmission belt is enabled to be reduced or restrained to a level smaller to the level which may cause the synchronous transmission belt being released from the transmission pulley, so a following pre-stressed idle wheel can be optionally installed;

FIG. 1 is a schematic view showing the main assembly according to the present invention;

As shown in FIG. 1, it mainly consists of:

through two noncircular synchronous transmission pulleys being combined with a transmission belt, a non-sliding synchronous transmission is formed between the synchronous transmission belt and the pulleys, so the noncircular active pulley can be driven to synchronously link the noncircular passive pulley for forming the noncircular synchronous transmission pulley set having periodically varying speed ratio and circumference compensating function, which is applicable in a treadle-drive device, e.g. a bicycle, a fixed treadle-drive bicycle for exercising or applicable in other transmission having periodically varying speed ratios; wherein:

active pulley assembly (500): a noncircular active pulley is combined on an active wheel shaft (111) used for inputting the rotational kinetic power, the active wheel shaft (111) is installed in a machine body through a bearing structure;

passive pulley assembly (600): composed of a noncircular passive pulley and a passive wheel shaft (211) serving as a revolving center, driven by a transmission belt having non-sliding synchronous transmission function, the passive pulley is used for directly driving a load or driving the load through a speed varying device;

transmission belt (100): composed of a chain or a tooth-shaped transmission belt, a non-releasing synchronous transmission feature is formed between the transmission belt and the active pulley and the passive pulley, thereby structuring a non-sliding synchronous transmission pulley set;

The mentioned pulley set includes being composed of a chain type transmission belt and a chain wheel, or a tooth-shaped pulley and a tooth-shaped transmission belt, or a tooth-shaped steel belt used for transmission and a gear. FIG. 2 is a schematic view showing the main assembly of the present invention being applied in a treadle-drive device;

As shown in FIG. 2, it mainly consists of:

through two noncircular synchronous transmission pulleys being combined with a transmission belt, a non-sliding synchronous transmission is formed between the synchronous transmission belt and the pulleys, so the noncircular active pulley can be driven to synchronously link the noncircular passive pulley for forming the noncircular synchronous transmission pulley set having periodically varying speed ratio and circumference compensating function, which is applicable in a treadle-drive device, e.g. a bicycle, a fixed treadle-drive bicycle for exercising or a treadle-drive power generator; wherein:

active pulley assembly (500): a noncircular active pulley is combined on an active wheel shaft (111) used for inputting the rotational kinetic power, the active wheel shaft (111) is installed in a machine body through a bearing structure, one side of the active wheel shaft (111) is installed with a first crank (101), a first treadle shaft (103) and a first treadle (102), the first treadle (102) drives the first crank (101) for linking the active pulley, the other side of the active wheel shaft (111) is installed with a second crank (201), a second treadle shaft (203) and a second treadle (202), the second treadle (202) drives the second crank (201) for linking the active pulley;

passive pulley assembly (600): composed of a noncircular passive pulley and a passive wheel shaft (211) serving as a revolving center, driven by a transmission belt having non-sliding synchronous transmission function, the passive pulley is used for directly driving a load or driving the load through a speed varying device;

transmission belt (100): composed of a chain or a tooth-shaped transmission belt, a non-releasing synchronous transmission feature is formed between the transmission belt and the active pulley and the passive pulley, thereby structuring a non-sliding synchronous transmission pulley set;

The mentioned pulley set includes being composed of a chain type transmission belt and a chain wheel, or a tooth-shaped pulley and a tooth-shaped transmission belt, or a tooth-shaped steel belt used for transmission and a gear.

Figure 3:
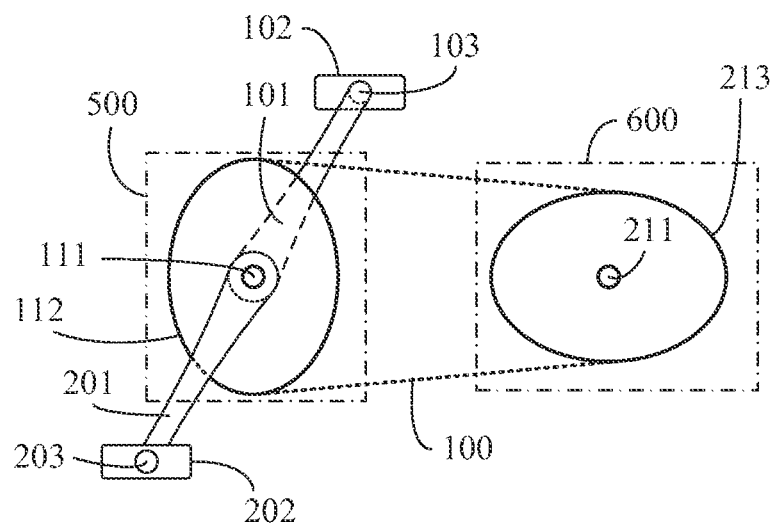
FIG. 3 is a schematic view showing two oval pulleys having phase angle differentiation being driven by the transmission belt for performing synchronous transmission thereby forming the noncircular synchronous transmission pulley set having periodically varying speed ratio and circumference compensating function as shown in FIG. 2.

FIG. 3 is a schematic view showing two oval pulleys having phase angle differentiation being driven by the transmission belt for performing synchronous transmission thereby forming the noncircular synchronous transmission pulley set having periodically varying speed ratio and circumference compensating function as shown in FIG. 2;

As shown in FIG. 3, it mainly consists of:

through two noncircular synchronous transmission pulleys being combined with a transmission belt, a non-sliding synchronous transmission is formed between the synchronous transmission belt and the pulleys, so the noncircular active pulley can be driven to synchronously link the noncircular passive pulley for forming the noncircular synchronous transmission pulley set having periodically varying speed ratio and circumference compensating function; wherein:

active pulley assembly (500): an oval active pulley (112) (or an oval-like active pulley) is combined on an active wheel shaft (111) used for inputting the rotational kinetic power, the active wheel shaft (111) is installed in a machine body through a bearing structure, one side of the active wheel shaft (111) is installed with a first crank (101), a first treadle shaft (103) and a first treadle (102), the first treadle (102) drives the first crank (101) for linking the oval active pulley (112), the other side of the active wheel shaft (111) is installed with a second crank (201), a second treadle shaft (203) and a second treadle (202), the second treadle (202) drives the second crank (201) for linking oval active pulley (112); radial mechanical angle between the two convex peaks of the oval shape and the radial mechanical angle between the first and the second crank can be set according to actual needs;

passive pulley assembly (600): composed of an oval passive pulley (213) (or an oval-like passive pulley) and a passive wheel shaft (211) serving as a revolving center, driven by a transmission belt having non-sliding synchronous transmission function, the oval passive pulley (213) is used for directly driving a load or driving the load through a speed varying device;

transmission belt (100): composed of a chain or a tooth-shaped transmission belt, a non-releasing synchronous transmission feature is formed between the transmission belt and the oval active pulley (112) and the oval passive pulley (213), thereby structuring a non-sliding synchronous transmission pulley set;

The mentioned pulley set includes being composed of a chain type transmission belt and a chain wheel, or a tooth-shaped pulley and a tooth-shaped transmission belt, or a tooth-shaped steel belt used for transmission and a gear.

Figure 4:
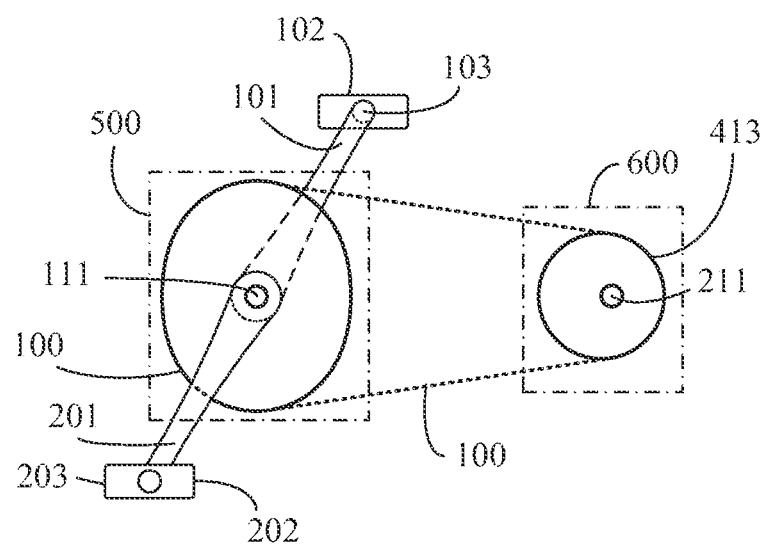
FIG. 4 is a schematic view showing an oval active pulley and an eccentric oval passive pulley being driven by the transmission belt for performing synchronous transmission thereby forming the noncircular synchronous transmission pulley set having periodically varying speed ratio and circumference compensating function as shown in FIG. 2.

FIG. 4 is a schematic view showing an oval active pulley and an eccentric oval passive pulley being driven by the transmission belt for performing synchronous transmission thereby forming the noncircular synchronous transmission pulley set having periodically varying speed ratio and circumference compensating function as shown in FIG. 2;

As shown in FIG. 4, it mainly consists of:

through two noncircular synchronous transmission pulleys being combined with a transmission belt, a non-sliding synchronous transmission is formed between the synchronous transmission belt and the pulleys, so the noncircular oval active pulley (112) can be driven to synchronously link the eccentric circular passive pulley (413) for forming the noncircular synchronous transmission pulley set having periodically varying speed ratio and circumference compensating function; wherein:

active pulley assembly (500): an oval active pulley (112) (or an oval-like active pulley) is combined on an active wheel shaft (111) used for inputting the rotational kinetic power, the active wheel shaft (111) is installed in a machine body through a bearing structure, one side of the active wheel shaft (111) is installed with a first crank (101), a first treadle shaft (103) and a first treadle (102), the first treadle (102) drives the first crank (101) for linking the oval active pulley (112), the other side of the active wheel shaft (111) is installed with a second crank (201), a second treadle shaft (203) and a second treadle (202), the second treadle (202) drives the second crank (201) for linking the oval active pulley (112); radial mechanical angle between the two convex peaks of the oval shape and the radial mechanical angle between the first and the second crank can be set according to actual needs;

passive pulley assembly (600): composed of an eccentric circular passive pulley (413) (or a substantially eccentric circular passive pulley) and a passive wheel shaft (211) serving as a revolving center, driven by a transmission belt having non-sliding synchronous transmission function, the eccentric circular passive pulley (413) is used for directly driving a load or driving the load through a speed varying device;

transmission belt (100): composed of a chain or a tooth-shaped transmission belt, a non-releasing synchronous transmission feature is formed between the transmission belt and the oval active pulley (112) and the eccentric circular passive pulley (413), thereby structuring a non-sliding synchronous transmission pulley set;

The mentioned pulley set includes being composed of a chain type transmission belt and a chain wheel, or a tooth-shaped pulley and a tooth-shaped transmission belt, or a tooth-shaped steel belt used for transmission and a gear.

According to the noncircular synchronous transmission pulley set having periodically varying speed ratio and circumference compensating function, both or at least one of the active pulley and the passive pulley includes being formed by (1) a noncircular pulley; or (2) a circular or noncircular eccentric pulley.

According to the noncircular synchronous transmission pulley set having periodically varying speed ratio and circumference compensating function, the eccentric pulley includes being formed by a circular eccentric pulley or a noncircular eccentric pulley.

According to the noncircular synchronous transmission pulley set having periodically varying speed ratio and circumference compensating function, the periodical rotation ratio of the active pulley and the passive pulley can be 1:2, 1:1, or 2:1 or other integer ratios.

According to the noncircular synchronous transmission pulley set having periodically varying speed ratio and circumference compensating function, the periodical rotating ratio of the active pulley and the passive pulley can be non-integer ratios.

The invention claimed is:

1. A synchronous transmission pulley set having a periodically varying speed ratio, comprising:
    a noncircular active pulley assembly (500) for inputting rotational kinetic energy and including a noncircular active pulley mounted on an active wheel shaft (111) installed in a machine body through a bearing structure;
    a passive wheel assembly (600) for driving a load and including a passive pulley mounted on a passive pulley shaft (211);
    a non-sliding transmission belt (100) for transmitting the rotational kinetic energy from the noncircular active pulley assembly (500) to the passive pulley of the passive wheel assembly (600),
    wherein the passive pulley is an eccentric circular pulley (413), said noncircular active pulley and passive pulley forming a transmission with a periodically varying speed ratio, and
    wherein an eccentricity of the passive pulley compensates for a varying diameter of the noncircular active pulley to thereby maintain tension in said non-sliding transmission belt without an additional tension wheel or pulley.

2. A synchronous transmission pulley set having a periodically varying speed ratio as claimed in claim 1, wherein the transmission belt (100) is one of a chain and a transmission belt having teeth for non-slidingly engaging the noncircular active pulley and passive pulley.

3. A synchronous transmission pulley set having a periodically varying speed ratio as claimed in claim 1, wherein the synchronous transmission pulley set is included in a treadle-drive device.

4. A synchronous transmission pulley set having a periodically varying speed ratio as claimed in claim 3, wherein the treadle-drive device is one of a bicycle, a stationary exercise bicycle, and a power generator.

5. A synchronous transmission pulley set having a periodically varying speed ratio as claimed in claim 1, wherein the noncircular active pulley (112) has an oval shape.

6. A synchronous transmission pulley set having a periodically varying speed ratio as claimed in claim 5, wherein the active pulley assembly (500) further includes:
    a first crank (101) on a first side of the active wheel shaft (111);
    a second crank (201) on a second side of the active wheel shaft (111);
    a first treadle (102) mounted to the first crank (101) by a first treadle shaft (103); and
    a second treadle (202) mounted to the second crank (201) by a second treadle shaft (203), and
    wherein and the first crank (101) and second crank (201) are mounted at a predetermined angle with respect to a major axis of the oval shape.

7. A synchronous transmission pulley set having a periodically varying speed ratio as claimed in claim 1, wherein the speed ratio between the active pulley and the passive pulley is an integer ratio.

8. A synchronous transmission pulley set having a periodically varying speed ratio as claimed in claim 7, wherein the speed ratio is 1:2, 1:1, or 2:1.

9. A synchronous transmission pulley set having a periodically varying speed ratio as claimed in claim 1, wherein the speed ratio between the active pulley and the passive pulley is a non-integer ratio.

* * * * *